United States Patent
Sloane

[11] 3,722,977
[45] Mar. 27, 1973

[54] OPTICAL SCATTERING FILTER
[75] Inventor: Howard J. Sloane, Fullerton, Calif.
[73] Assignee: Beckman Instruments, Inc.
[22] Filed: Aug 30, 1971
[21] Appl. No.: 176,231

Related U.S. Application Data

[63] Continuation of Ser. No. 348,387, March 2, 1964, abandoned.

[52] U.S. Cl. ..........................350/1, 250/86, 350/316
[51] Int. Cl. ..................................................G02b 5/22
[58] Field of Search ............350/1, 311, 316; 250/86

[56] References Cited

UNITED STATES PATENTS

| | | | |
|---|---|---|---|
| 3,034,916 | 5/1962 | Eshner | 350/164 UX |
| 3,279,938 | 10/1966 | Schneeberger | 350/1 X |

OTHER PUBLICATIONS

Barnes et al., "Filters in the Infrared," Journal of the Optical Society of America, Vol. 26, Dec. 1936, pp. 428–433

Yamada et al., "Transmission Filters in the Far Infrared Region," Journal of the Optical Society of America, Vol. 52, Jan. 1962, pp. 17–19

Primary Examiner—David Schonberg
Assistant Examiner—Toby H. Kusmer
Attorney—Paul R. Harder and Robert J. Steinmeyer

[57] ABSTRACT

Long pass optical filters for the infrared region and methods of making the same are disclosed which utilize a transmitting matrix of high and low refractive index materials for selectively scattering all wavelengths shorter than a critical wavelength and which have a relatively sharp cut-on front. By the inclusion of materials having absorption bands at wavelengths longer than the cut-on wavelength of the scattering medium, the cut-on front may be sharpened and positioned over a wide range to provide a filter having a preselected cut-on wavelength and cut-on front.

22 Claims, 6 Drawing Figures

INVENTOR
HOWARD J. SLOANE
BY
ATTORNEY 3,722,977

OPTICAL SCATTERING FILTER

This application is a continuation of Ser. No. 348,387, filed Mar. 2, 1964, now abandoned.

This invention relates generally to the selection of radiant energy and more particularly to methods and means capable of selectively transmitting infrared radiation while attenuating all wavelengths shorter than a preselected wavelength.

The invention is based in part upon the selective scattering of all wavelengths shorter than some critical wavelength that is obtained from the even dispersion of two materials having differing indices of refraction. Such a combination provides an optical filtering device which is substantially opaque to wavelengths shorter than the cut-on wavelength and provides a relatively sharp cut-on front.

By combining such materials with materials having absorption bands at wavelengths longer than the cut-on wavelength provided by the scattering materials, the cut-on front may be sharpened and positioned over a wide range to provide a filter having a preselected cut-on wavelength and cut-on front shape.

The invention is also based in part on the discovery that certain plastic microporous membranes provide selective scattering of all wavelengths shorter than some critical wavelength and provide highly efficient optical filtering in the infrared region.

A principal object of this invention is to provide an optical filter utilizing microporous membranes.

Another object is to provide an infrared long pass filter which is substantially opaque to all radiation of wavelengths shorter than a critical wavelength and which is highly transparent to longer wavelengths.

Another object is to provide an infrared filter having a preselected cut-on wavelength and cut-on front shape.

Still another object is to provide an infrared filter wherein selective scattering and absorption are utilized to form the filter cut-on front.

Other objects and many of the attendant advantages of this invention will become more readily apparent to those skilled in the art as the same becomes better understood by reference to the following detailed description when considered in connection with the attached drawings wherein.

As used herein the term "cut-on front" of a filter means the transmission characteristics of a filter at its shorter wavelengths of transmission. The term "cut-on wavelength" is used to mean that wavelength below which transmission of the material or filter is less than 1 percent and "cut-on front width" means the difference between the wavelength at which the filter reaches approximately 50 percent transmittance and the cut-on wavelength. It should be understood that these points are arbitrarily chosen so that the approximate configuration of the cut-on front may be defined.

Microporous polyethylene filters have been obtained from Millipore Filter Corporation, Bedford, Massachusetts. Millipore's Type OH solvent resistant filter comprises a polyethylene matrix having, according to the supplier, a mean pore size of 1.5 microns ±0.5 microns and a thickness of 127 microns ±13 microns. The pores are uniformly distributed throughout the filter and vary from approximately 1.0 micron to 2.0 microns with a mean pore size of approximately 1.5 microns. The pore volume occupies a high percentage of the total volume of the filter.

Millipore's solvent resistant filter Type OS has a mean pore size of 10.0 ±3.0 microns and a thickness of 280 ±25 microns. The matrix of this filter is likewise polyethylene with the pores uniformly distributed therethrough and occupying a large percentage of the total filter volume.

An ideal "long-pass" optical filter would be completely opaque below a critical wavelength and would be highly transmissive above that critical wavelength. However, most prior art optical filters have not obtained this degree of perfection and, although substantially opaque below a critical wavelength, such filters begin to transmit gradually with increasing efficiency for increasing wavelengths beyond the critical wavelength. In many applications the sharper this cut-on front may be made the more useful the filter becomes.

Figure 1:
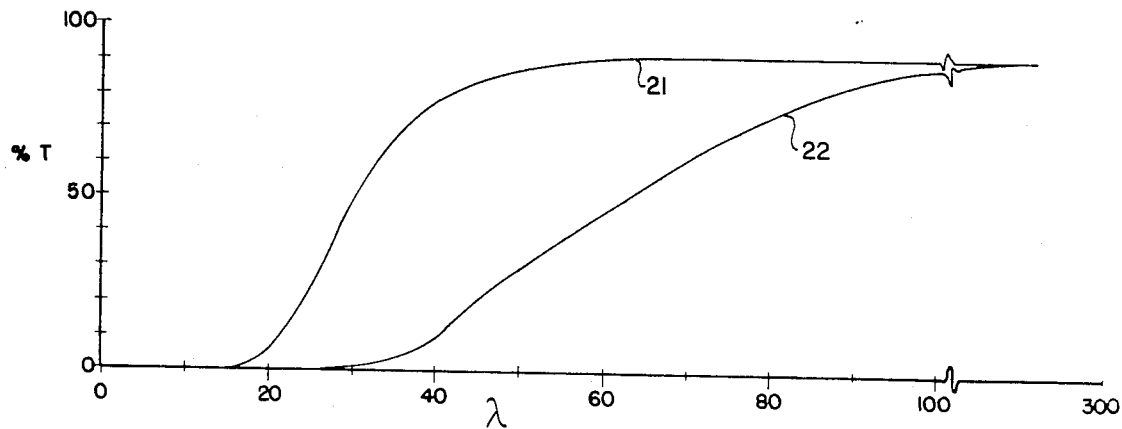
FIG. 1 illustrates the optical characteristic of certain microporous filters embodying the invention.

It has been unexpectedly discovered that the microporous polyethylene filters heretofore mentioned possess highly desirable optical characteristics in the infrared region. Curves 21 and 22 of FIG. 1 illustrate the transmission characteristics of Millipore's Type OH and OS solvent resistant filters respectively. The Type OH or the 1.5 micron pore size filter has a cut-on wavelength of approximately 15 microns and the Type OS or 10 micron pore size filter has a cut-on wavelength of approximately 26 microns. Each of these filters transmits less than 1 percent of all wavelengths shorter than their respective cut-on wavelengths and each reaches approximately 50 percent transmittance at approximately 30 and 62 microns respectively, i.e., each has a cut-on front width of approximately 15 and 36 microns respectively. The Type OH filter has a transmittance of more than 70 percent for all wavelengths longer than approximately 36 microns and Type OS transmits more than 70 percent of the incident radiation for all wavelengths longer than approximately 76 microns. These filters are particularly useful in the infrared region since polyethylene in thin layers contains no intense absorption bands in the region from approximately 14 microns to approximately 300 microns. It is believed that no absorption bands occur beyond 300 microns.

The cut-on front of each of these filters is due to the scatter effect produced by a finely divided material having a low refractive index uniformly distributed throughout a matrix of material having a higher refractive index. In each of these filters the finely divided low refractive index material is air having a refractive index of 1.0 which is uniformly distributed through the pores of the polyethylene matrix which has a refractive index of approximately 1.5. This finely divided, uniformly distributed, low refractive index material in a matrix of high refractive index material provides a scattering medium which selectively scatters incident radiation for all wavelengths shorter than the cut-on wavelength while passing wavelengths longer than this critical wavelength.

Applicant has found that the optical characteristics of various specimens of the same type of filter obtained form Millipore Corporation vary slightly from specimen to specimen and the curves of FIG. 1 are illustrative of only one specimen of each type. For example, some specimens of the Type OH filter have been found to cut-on at approximately 10 microns. Although the reasons for this variation are not fully understood, it is believed that these variations are due to minor variations in the manufacturing process. It is believed that the variations in the cut-on wavelength and the sharpness of the cut-on front result from slight variations in the porosity of the filter, i.e., the ratio of the pore volume to the total volume of the filter, variations in the average pore size, and variations in the distribution of the pore size.

By combining with the scattering medium materials having absorption bands in the transmitting region of the scattering medium in sufficient concentrations to absorb substantially all of the radiation transmitted by the scattering medium over a desired region, the cut-on front may be varied over a wide range of desired wavelengths.

Figure 2:
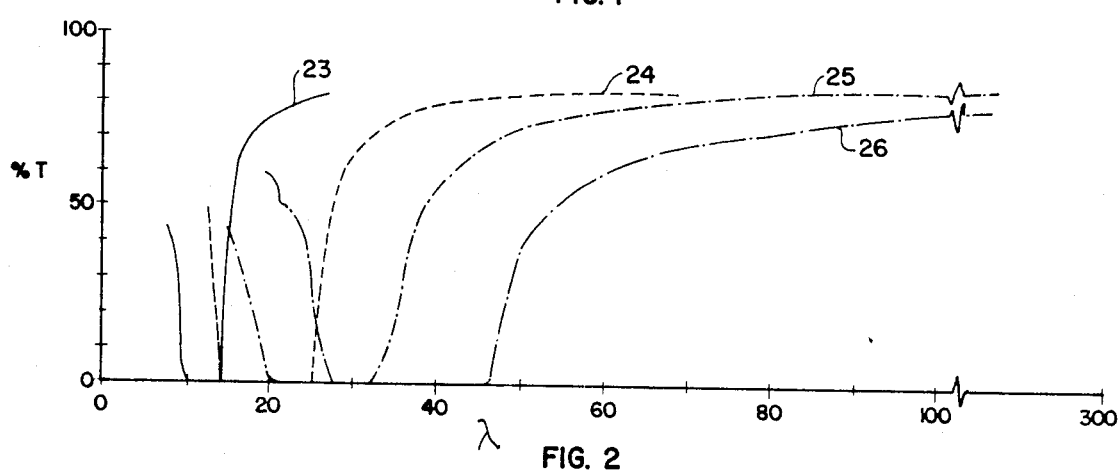
FIG. 2 illustrates the absorption bands of various materials in the infrared region.

Referring now to FIG. 2 there is illustrated the transmission characteristics of various materials having absorption bands in the short wavelength transmission region of the filters of FIG. 1. Curve 23 represents the absorption band of BeO at a very low concentration. Curves 24, 25 and 26 represent, respectively, absorption bands produced by freshly smoked MgO, LiF and $SrF_2$. It should be noted that the short wavelength side of each band overlaps the longer wavelength side of the next succeeding band. By finely dividing an appropriate amount of each of these compounds and uniformly distributing them through a transparent matrix a total absorption band which is substantially opaque from approximately 10 microns to 46 microns is obtained. Inasmuch as the total absorption band produced by these compounds is opaque from approximately 10 microns to 46 microns and the Type OH and OS filters are each opaque to radiation of wavelengths shorter than 14 microns by combining the total absorption band of these materials with either of these scattering media a filter may be produced which is substantially opaque to radiation of wavelengths shorter than approximately 46 microns and transmits all longer wavelengths since none of these materials have significant absorption band beyond the cut-on wavelength.

For the preparation of an optical filter after the foregoing teachings sufficient quantities of $SrF_2$, freshly smoked MgO, BeO and LiF to provide, respectively, concentrations of 24.4 mg/in², 12.2 mg/in², 7.3 mg/in² and 4.1 mg/in² are finely divided and thoroughly mixed with a quantity of finely divided polyethylene powder such as, for example, U.S. Industrial Chemical's Microthene 620. The amount of polyethylene is not critical. Too little of the polyethylene powder produces a matrix which is brittle. A slight excess of polyethylene does not materially affect the performance of the filter except for a slight decrease in energy at the longer wavelengths. However, a large excess of polyethylene produces a significant decrease in the transmitted energy. It has been found that an amount sufficient to provide a concentration of approximately 83 percent by weight provides a matrix which may be readily compressed at moderate temperatures and is relatively non-brittle.

After the absorbing materials and the polyethylene are finely divided and thoroughly mixed the blended powder is placed in a die, heated to a temperature sufficient to cause the polyethylene to flow but which is below the fusion temperature of the absorbance material and compacted at high pressures, for example, greater than 10,000 p.s.i., to produce a wafer of any desired shape, generally a thin, flat disc. The material is allowed to cool under pressure to approximately 65° C. before removal from the die. The disc is removed and placed in series with either of the microporous filters hereinbefore described to scatter the shorter wavelengths.

Figure 3:
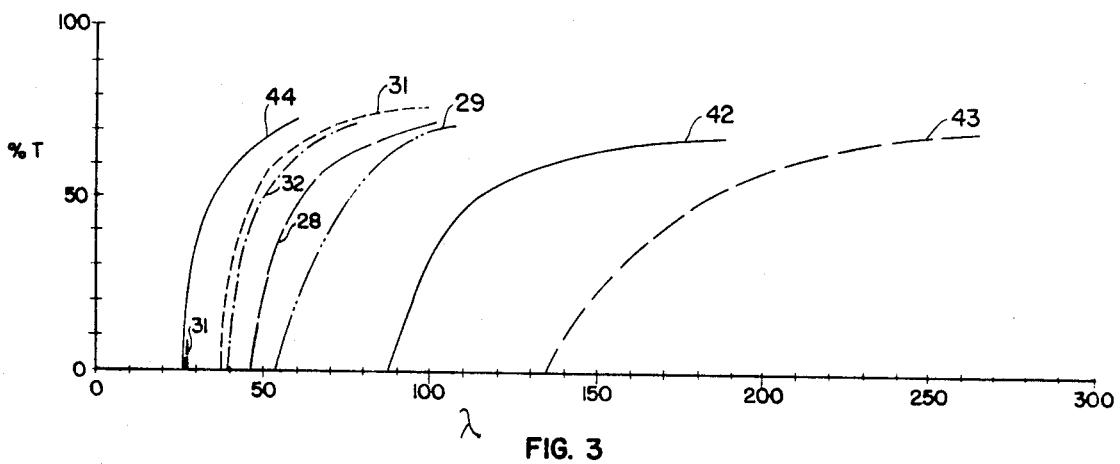
FIG. 3 illustrates the optical characteristics of various filters embodying the teachings of this invention.

As a specific example of the particular filter 300 mg of Microthene 620 polyethylene powder, 30 mg of $SrF_2$, 15 mg of freshly smoked MgO, 9 mg of BeO and 5 mg of LiF were finely divided and thoroughly mixed. All of the material was placed in a die having a diameter of 1.25 inches, heated to 100° C. and compacted at a pressure of 12,000 p.s.i. to produce a flat disc 1.25 inches in diameter. The disc was secured in series with a Millipore Type OH filter and when subjected to radiation has the optical characteristics illustrated by curve 28 of FIG. 3. The composite filter transmits more than 70 percent of all incident radiation above 100 microns, has a cut-on wavelength of approximately 46 microns and a cut-on front width of approximately 16 microns. The filter is substantially opaque to all wavelengths shorter than the cut-on wavelength transmitting less than 1 percent throughout the shorter wavelength region.

A second filter was prepared by mixing sufficient quantities of $BaF_2$, $SrF_2$, LiF, BeO and freshly smoked MgO to provide concentrations of 26.9 mg/in², 6.5 mg/in², 8.2 mg/in², 8.2 mg/in² and 12.2 mg/in² respectively, with polyethylene powder and compacted at a pressure of approximately 12,000 p.s.i. while heating to approximately 100° C. When combined with a Millipore Type OH filter as a scatter media the optical filter has a cut-on wavelength of approximately 53 microns, a cut-on front width of approximately 21 microns and transmits 70 percent of the incident energy for all wavelengths longer than 98 microns. The filter is substantially opaque for all wavelengths shorter than the cut-on wavelength, transmitting less than 1 percent. The optical characteristics of this filter are illustrated by curve 29 of FIG. 3.

Another filter was prepared after the teachings of this invention by mixing a sufficient quantity of $TiO_2$ to provide a concentration of 18.3 mg/in² with polyethylene powder and compacted at a pressure of approximately 12,000 p.s.i. while heating to approximately 100°C. When combined with the Millipore Type OH filter as a scatter media the optical filter has a cut-on wavelength of approximately 37 microns, a cut-on front width of approximately 8 microns and transmits 70 percent of the incident energy for all wavelengths longer than approximately 70 microns. The optical characteristics of this filter are illustrated by curve 31 of FIG. 3. As illustrated in this filter there is a slight radiation leak centered at about 27 microns and transmitting 8 to 10 percent of the incident radiation. If this leak is objectionable, a Millipore Type OS filter having a cut-on wavelength of approximately 30 microns may be utilized to exclude this leak, or another component such as LiF may be added. By maintaining the LiF at a minimum concentration the filter front will remain substantially unaffected.

The 27 micron leak in the previous filter may also be readily eliminated by slightly increasing the concentration of the $TiO_2$ in the filter. This results in a slight shift in the cut-on wavelength, a slight increase in the cut-on front width and a slight loss in energy over the shorter wavelength transmission region. For example, the concentration of $TiO_2$ was increased to 24.4 mg/in$^2$ and when combined with a Type OH filter had the optical characteristics illustrated by curve 32 of FIG. 3. The cut-on wavelength has shifted to approximately 38 microns and the filter reaches 50 percent transmission at about 50 microns thus having a cut-on front width of approximately 12 microns. It will be noted that curve 31 for the filter having a lesser concentration of $TiO_2$ has a transmission of approximately 58 percent at 50 microns. By utilizing the heavier concentration of $TiO_2$ the leak at 27 microns is eliminated, the filter transmitting less than 1 percent of the incident radiation for all wavelengths shorter than the cut-on wavelength. However, as is indicated by the curve, the filter does not reach 70 percent transmission until approximately 71 microns.

Figure 4:
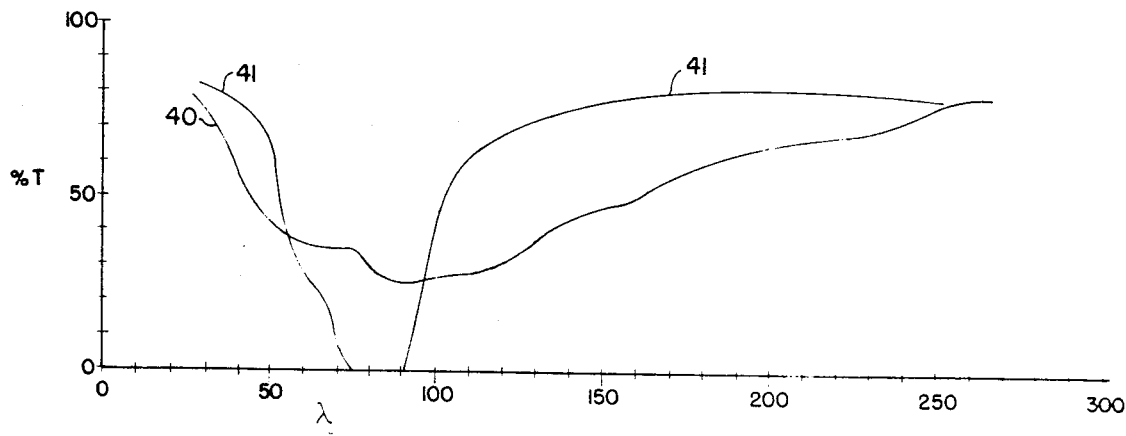
FIG. 4 illustrates the absorption band of a particular hygroscopic material.

Certain of the materials having absorption bands in the infrared region and thus finding utility in optical filters constructed after the teachings of this invention possess hygroscopic properties which cause the finely divided particles to coalesce thus making the uniform distribution of the finely divided particles throughout a matrix extremely difficult. Failure to obtain an even distribution of the particles throughout the filter at a given concentration produces an absorption band which does not absorb all of the incident energy producing a broader, shallower band. For example, curve 40 of FIG. 4 illustrates the absorption band of KBr in the region of 80 microns which was obtained by dry mixing KBr in polyethylene in sufficient quantities to provide a concentration of 28.5 mg/in$^2$. By utilizing the process disclosed in detail and claimed in the copending application of Howard J. Sloane and Gerald T. Keahl for Optical Filtering Devices and Methods of Making Same, Ser. No. 348,444, now abandoned, filed concurrently herewith and assigned to the assignee of the instant application, the KBr may be uniformly dispersed throughout the polyethylene matrix. When the same concentration of 28.5 mg/in$^2$ of KBr is completely dispersed throughout the matrix the material provides an absorption band which is substantially opaque from approximately 75 microns to 89 microns as illustrated by curve 41 of FIG. 4.

Briefly, this complete dispersion of a hygroscopic material such as KBr may be accomplished by grinding the KBr to provide finely divided particles while adding small quantities of a highly refined mineral oil such as, for example, Nujol, manufactured by Plough, Inc. Polyethylene powder is then added with additional small amounts of the oil until a creamy, uniform mixture is obtained. This mixture is placed in a die, heated and pressed at sufficient temperatures to cause fusion of the polyethylene to form a thin flat wafer of any suitable shape. During the process the mineral oil becomes less viscous, flows from the wafer and a portion appears to evaporate. The wafer is then leached with any organic solvent which does not dissolve polyethylene such as, for example, hexane or heptane, to remove the residual oil from the wafer. The wafer is then reheated to a temperature below that originally used but which is sufficient to soften the polyethylene and repressed to flatten the wafer which may deform during the leaching process. A temperature of approximately 80 C. has been found suitable for this reheating process. This leaching, reheating and pressing process may, if desired, be repeated.

As an example of a filter produced by the foregoing process sufficient quantities of KBr, $BaCO_3$ and $BaF_2$ sufficient to provide concentrations of 24.4 mg/in$^2$ each and quantities of $PbCO_3$ and LiF sufficient to provide concentrations of 8.2 mg/in$^2$ each were ground in a mull of Nujol mineral oil and subsequently Microthene 620 polyethylene powder was added. The mixture was heated and pressed; leached, reheated and repressed; and again leached before a final heating and pressing. When combined with a microporous polyethylene filter of Millipore's Type OS the composite filter produced a transmission characteristic indicated by the curve 42 of FIG. 3.

As a second example which contained two hygroscopic inorganic compounds, i.e., KBr and CsBr, an absorption matrix was prepared utilizing the following concentrations of absorbing materials: KBr, 24.4 mg/in$^2$; CsBr, 65.2 mg/in$^2$; $CaCO_3$, 24.4 mg/in$^2$; $BaCO_3$, 24.4 mg/in$^2$; $Li_2CO_3$, 8.2 mg/in$^2$; and $BaF_2$, 24.4 mg/in$^2$. The wafer obtained was combined with a Millipore Type OS filter and produced an optical characteristic indicated by curve 43 of FIG. 3.

It should be noted that in the foregoing examples freshly smoked MgO has been utilized. It has been discovered that the absorption band of freshly smoked MgO differs materially from the absorption band of commercially available, powdered MgO.

Figure 5:
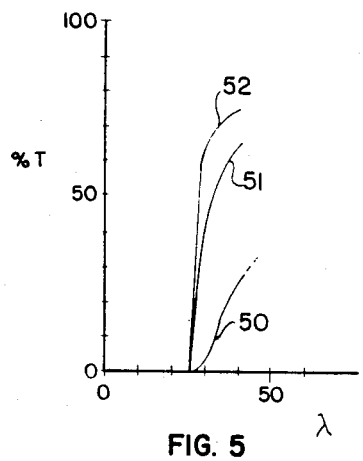
FIG. 5 illustrates the change in the long wavelength side of the absorption band of MgO when prepared and utilized according to the teachings of this invention.

Referring to FIG. 5, curve 50 illustrates the absorption band obtained by scanning the spectra of commercially supplied, powdered MgO sold by J. B. Baker Chemical Co., Phillipsburg, N.J., under the tradename "Baker's Analyzed". 37 milligrams of this MgO powder were thoroughly mixed with 0.6 grams of Microthene 620 polyethylene powder, heated to a temperature of 100° C. and pressed at a pressure of 12,000 p.s.i. to provide a thin flat disc having a diameter of 1.25 inches.

The long wavelength side of this absorption band may be materially sharpened by utilization of freshly smoked MgO. To obtain the freshly smoked MgO, Mg ribbon was burned in air and the smoke entrapped to obtain the freshly smoked MgO powder. 37 milligrams of this freshly smoked MgO were thoroughly admixed with 0.6 grams of Microthene 620 polyethylene and formed into a thin disc having a diameter of 1.25 inches by heating and pressing at the same temperature and pressure utilized in the foregoing examples. The transmission characteristics of this freshly smoked MgO in a polyethylene matrix is illustrated by curve 51 of FIG. 5.

As illustrated, commercially available MgO becomes opaque at approximately 27 microns while freshly smoked MgO becomes opaque at approximately 26 microns. However, the absorption band is materially sharpened, freshly smoked MgO reaching a transmission of 60 percent at approximately 37 microns. Commercially available MgO has a transmission of only about 20 percent at this same wavelength.

It has further been found that the long wavelength side of the MgO absorption band may be further sharpened by depositing freshly smoked MgO on any transparent matrix such as, polyethylene. Curve 52 of FIG. 5 was obtained by scanning the spectra of a 1.25 inch diameter polyethylene disc formed by heating and pressing 0.6 grams of Microthene 620 polyethylene powder at a temperature of 100° C. and a pressure of 12,000 p.s.i. Thirty-seven milligrams of smoked MgO was deposited on the surface of this matrix by burning Mg ribbon in air and allowing the smoke to deposit upon the matrix. As illustrated the absorption band of MgO freshly smoked onto the surface of this matrix has a cut-on wavelength of approximately 26 microns and transmits approximately 73 percent of the incident radiation at 37 microns.

In each of the foregoing examples it will be appreciated that the concentration of the MgO is the same, being approximately 30 mg/in².

Figure 6:
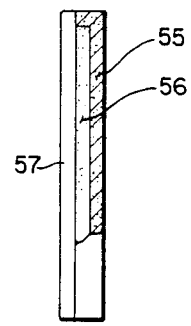
FIG. 6 illustrates a filter partially in section constructed according to the teachings of this invention.

FIG. 6 illustrates another example of a filter constructed after the teachings of this invention. In this filter a sufficient quantity of BeO to provide a concentration of 4.1 mg/in² was finely divided and thoroughly mixed in a quantity of finely divided polyethylene. The blended powder was heated to approximately 100° C. and pressed at approximately 12,000 p.s.i. in a die which provided a thin membrane having an outer lip to form the configuration illustrated in cross section at 55. Within the recess freshly smoked MgO powder 56 was uniformly deposited by burning Mg in air and allowing the smoke to deposit on the inner face of the membrane.

A sufficient quantity of MgO was smoked to provide a layer of substantially uniform density and a concentration of approximately 30 mg/in². A Millipore Type OH microporous membrane 57 having a cut-on wavelength of 10 microns was affixed to the outer flange and secured by any suitable means to provide the finished filter. The filter has a cut-on wavelength of approximately 26 microns, a cut-on front width of approximately 8 microns, transmits more than 70 percent of the incident energy at all wavelengths longer than approximately 56 microns and less than 1 percent at all wavelengths shorter than the cut-on wavelength. The transmittance characteristic of the filter of FIG. 6 is illustrated by the curve 44 in FIG. 3.

In each of the foregoing examples polyethylene has been utilized as the matrix not only in the scatter medium but also as the matrix for the absorption materials. Polyethylene is particularly suited for this purpose inasmuch as it has no significant absorption bands in the region from 15 microns to 300 microns, the area of interest. The only critical criteria of the material used as the matrix for the absorbance media is that it should fuse at a relatively low temperature and should have no significant absorption bands in the area of desired filter transmittance. For example, in suitably thin layers polystyrene has been found useful in the region from 20 microns to at least 300 microns and polytetrafluoroethylene from approximately 58 microns to at least 300 microns.

It should be understood that although in each of the foregoing examples specific concentrations of the absorbing materials have been given, these concentrations generally are not critical. With the exception of the absorbing material having the absorption band the long wavelength side of which forms the cut-on front of the finished filter the only critical criteria for the absorption materials is that the concentration is sufficient to render the region below the cut-on wavelength of the composite filter opaque to the desired degree and should not be of such concentration as to materially decrease the transmission at longer wavelengths. Insofar as the absorbing material having the absorption band which forms the cut-on front of the filter is concerned, the cut-on wavelength and the sharpness of the cut-on front is a direct function of the concentration of this material. The concentration of this material should therefore be closely controlled if reproducibility from one filter to the next is to be obtained and optimum characteristics of the cut-on front are desired. Therefore, even the concentration of this absorbing material is not critical except as required by the desired degree of performance.

It should also be understood that other methods of construction are possible other than the hot pressing process described. For example, hot rolling processes known to the art may, if desired, be utilized.

It should further be understood that the cut-on wavelengths and cut-on front widths given throughout this specification and the curves illustrated in the drawings are only exemplary and are produced by one particular filter constructed after the teachings of this invention. It should be appreciated that the cut-on wavelengths and the sharpness of the cut-on front will vary somewhat from filter to filter depending upon the care taken in the weighing of the particular compounds, the procedures followed in forming the filter disc and the calibration of the instrument upon which the spectrum is run. Thus the specific formulations and the curves therefor are given by way of illustration only and not by way of limitation and many modifications and variations of the present invention are possible in light of the foregoing teachings without departing from the spirit and scope of the invention as set forth in the appended claims.

I claim:

1. An optical filter having relatively high transmission to infrared radiation comprising:
   a thin transmitting wafer comprising a microporous material producing selective scattering of all wavelengths shorter than a selected wavelength, said wafer (i) having a relatively sharp cut-on front, (ii) being substantially opaque to radiation of wavelengths shorter than said selected wavelength and (iii) being highly transmissive to radiation of wavelengths longer than said cut-on front; and
   at least one absorbing material having an absorption band in the shorter wavelength transmission region of said wafer, said material absorbing at least a portion of the energy transmitted by said wafer.

2. An optical filter having relatively high transmission to infrared radiation comprising:

a thin transmitting wafer comprising a microporous material producing selective scattering of all wavelengths shorter than a selected wavelength; and at least one absorbing material having an absorption band in the shorter wavelength transmission region of said wafer, said material absorbing at least a portion of the energy transmitted by said wafer.

3. An optical filter having relatively high transmission to infrared radiation comprising:

a polyethylene matrix having micron size pores of substantially uniform diameter substantially evenly distributed therethrough, said matrix being substantially opaque to all wavelengths shorter than a first wavelength; and at least one material having an absorption band in the shorter wavelength transmission region of said matrix and absorbing at least a portion of the energy transmitted by said matrix.

4. An optical filter having relatively high transmission to infrared radiation comprising:

a polyethylene matrix having substantially evenly distributed pores therein of substantially uniform diameters, said matrix being substantially opaque to radiation of wavelengths shorter than a first wavelength and having a relatively sharp cut-on front and being highly transmissive to radiation of wavelengths longer than said cut-on front; and a plurality of absorbing materials having overlapping absorption bands of such intensity that the region from a second wavelength to a third wavelength is substantially opaque, said second wavelength being shorter than said first wavelength and said third wavelength being longer than said first wavelength such that said filter is substantially opaque to radiation of wavelengths shorter than said third wavelength, said materials positioned to absorb radiation between said second and third wavelengths.

5. An optical filter having relatively high transmission to infrared radiation comprising the combination of:

a first matrix of polyethylene having micron size pores of substantially uniform diameter substantially evenly distributed therethrough, said matrix being substantially opaque to radiation of wavelengths shorter than a first wavelength; having a relatively sharp cut-on front and being highly transmissive to radiation longer than said cut-on front; and at least a second matrix having at least one finely divided material evenly distributed therethrough, said finely divided material having an absorption band that is substantially opaque between a first and second wavelength, said second wavelength being shorter than said first wavelength and said third wavelength being longer than said first wavelength, said second matrix having no significant absorption bands in the region from said third wavelength to at least 300 microns.

6. An optical filter having relatively high transmission to infrared radiation comprising:

a polyethylene matrix having micron size pores of substantially uniform diameter substantially evenly dispersed therethrough;

at least a second matrix; and a plurality of absorbing materials having overlapping absorption bands of intensity such that the region between a second wavelength and a third wavelength is substantially opaque, said second wavelength being shorter than said first wavelength and said third wavelength being longer than said first wavelength, each of said plurality of absorbing materials being finely divided and substantially evenly dispersed throughout said second matrix, said second matrix having no significant absorption bands in the region from said third wavelength to at least 300 microns.

7. An optical filter having relatively high transmission to infrared radiation and a cut-on wavelength in the region from approximately 14 to 150 microns comprising:

a matrix having micron size pores of substantially uniform diameter substantially evenly distributed therethrough for scattering radiation of wavelengths shorter than a preselected wavelength and transmitting radiation longer than said preselected wavelength; and at least one material having an absorption band in the region of wavelengths longer than said preselected wavelength selected from the group $BaCO_3$, $BaF_2$, $BeO$, $CaCO_3$, $Li_2CO_3$, $LiF$, $SrF_2$, $TiO_2$ and freshly smoked $MgO$, said material positioned to absorb radiation in the region of wavelengths longer than said preselected wavelength.

8. An optical filter having relatively high transmission to infrared radiation and a cut-on wavelength in the region from approximately 14 to 150 microns comprising:

a matrix having micron size pores of substantially uniform diameter substantially evenly distributed therethrough for scattering wavelengths shorter than a preselected wavelength and transmitting radiation longer than said preselected wavelength; and a plurality of absorbing materials having absorption bands in the region of wavelengths longer than said preselected wavelength, said materials being substantially evenly distributed throughout a matrix, at least one of said materials selected from the group $BaCO_3$, $BaF_2$, $BeO$, $CaCO_3$, $Li_2CO_3$, $LiF$, $SrF_2$, $TiO_2$ and freshly smoked $MgO$, said materials positioned to absorb radiation in the region of wavelengths longer than said preselected wavelength.

9. An optical filter having relatively high transmission to infrared radiation and a cut-on wavelength in the region below 150 microns comprising:

a polyethylene matrix having micron size pores of substantially uniform diameter substantially evenly dispersed therethrough, said matrix being substantially opaque to all wavelengths shorter than a first wavelength in the regions from approximately 14 to 35 microns; and at least one material having an absorption band in the region of wavelengths longer than said first wavelength selected from the group $BaCO_3$, $BaF_2$, BeO, $CaCO_3$, $Li_2CO_3$, LiF, $SrF_2$, $TiO_2$ and freshly smoked MgO, said material positioned to absorb radiation in the region of wavelengths longer than said first wavelength.

10. An optical filter having relatively high transmission to infrared radiation comprising:
a thin transmitting wafer comprising a matrix having micron size pores of substantially uniform diameter substantially evenly distributed therethrough, said wafer producing selective scattering of all wavelengths shorter than a selected wavelength; and
at least one non-hygroscopic absorbing material having an absorption band in the shorter wavelength transmission region of said wafer, said material absorbing at least a portion of the energy transmitted by said wafer.

11. An optical filter according to claim 10 wherein said absorbing materials are substantially evenly distributed through a second thin transmitting wafer.

12. An optical filter according to claim 10 wherein said matrix is polyethylene.

13. An optical filter according to claim 8 wherein:
said preselected wavelength is in the region from approximately 10 to 35 microns; and
said plurality of absorbing materials have overlapping absorption bands of intensity such that the region between said preselected wavelength and about 46 microns is substantially opaque, said plurality of absorbing materials including $SrF_2$, BeO, LiF and freshly smoked MgO, said materials positioned to absorb radiation between said preselected wavelength and about 46 microns.

14. An optical filter according to claim 13 wherein said plurality of absorbing materials include approximately 24.4 mg/in² of $SrF_2$, 7.3 mg/in² of BeO, 4.1 mg/in² of LiF, and 12.2 mg/in² of freshly smoked MgO.

15. An optical filter according to claim 8 wherein:
said preselected wavelength is in the region from approximately 10 to 35 microns; and
said plurality of absorbing materials have overlapping absorption bands of intensity such that the region between said preselected wavelength and about 53 microns is substantially opaque, said plurality of absorbing materials including $BaF_2$, $SrF_2$, LiF, BeO, and freshly smoked MgO, said materials positioned to absorb radiation between said preselected wavelength and about 53 microns.

16. An optical filter according to claim 15 wherein:
said plurality of absorbing materials include 26.9 mg/in² of $BaF_2$, 65 mg/in² of $SrF_2$, 8.2 mg/in² LiF and BeO and 12.2 mg/in² of freshly smoked MgO.

17. An optical filter according to claim 2 wherein:
said preselected wavelength is in the region from approximately 10 to 35 microns; and
said one absorbing material comprises a sufficient quantity of $TiO_2$ evenly distributed over an area in sufficient quantity to render the region between said preselected wavelength and about 37 microns substantially opaque.

18. An optical filter according to claim 17 wherein:
said quantity of $TiO_2$ is approximately 18.3 mg/in².

19. An optical filter according to claim 2 wherein:
said preselected wavelength is in the region from approximately 10 to 20 microns; and
said one absorbing material comprises a sufficient quantity of freshly smoked MgO in such concentration to render the region between said preselected wavelength and about 26 microns substantially opaque.

20. An optical filter according to claim 19 wherein:
said concentration of freshly smoked MgO is approximately 30 mg/in².

21. An optical filter according to claim 8 wherein:
said preselected wavelength is in the region from approximately 10 to 20 microns; and
said plurality of absorbing materials have overlapping absorption bands of intensity such that the region between said preselected wavelength and about 26 microns is substantially opaque, said plurality of absorbing materials including BeO and freshly smoked MgO and positioned to absorb radiation between said preselected wavelength and about 26 microns.

22. An optical filter according to claim 21 wherein:
said plurality of absorbing materials include 4.1 mg/in² of BeO and 30 mg/in² of freshly smoked MgO.

* * * * *